(12) United States Patent
Kaertner et al.

(10) Patent No.: US 7,405,868 B2
(45) Date of Patent: Jul. 29, 2008

(54) CAVITY-ENHANCED OPTICAL PARAMETRIC AMPLIFICATION

(75) Inventors: Franz X. Kaertner, Newton, MA (US); Fatih Omer Ilday, Ankara (TR)

(73) Assignee: Massachusetts Institute of Technology, Cambridge, MA (US)

( * ) Notice: Subject to any disclaimer, the term of this patent is extended or adjusted under 35 U.S.C. 154(b) by 199 days.

(21) Appl. No.: 11/279,455

(22) Filed: Apr. 12, 2006

(65) Prior Publication Data

US 2007/0013995 A1     Jan. 18, 2007

Related U.S. Application Data

(60) Provisional application No. 60/670,441, filed on Apr. 12, 2005.

(51) Int. Cl.
*G02F 1/35* (2006.01)
*G02F 2/02* (2006.01)

(52) U.S. Cl. ....................... 359/330
(58) Field of Classification Search ............... 359/326, 359/330; 372/21, 22, 92, 98, 105
See application file for complete search history.

(56) References Cited

U.S. PATENT DOCUMENTS

| | | | |
|---|---|---|---|
| 5,117,126 A | 5/1992 | Geiger | 359/330 |
| 5,640,480 A * | 6/1997 | Komine | 385/122 |
| 6,038,055 A | 3/2000 | Hänsch et al. | 359/279 |
| 6,320,886 B1 | 11/2001 | Dawber et al. | 372/22 |

OTHER PUBLICATIONS

Jovanovic et al., "Hybrid chirped-pulse amplification", *Optics. Lett.*, 27(18):1622-1624 (2002).
Robertson, W.P., "Optoelectronic techniques for microwave and millimeter-wave engineering", Artech House, Norwood, MA, XP-002394723, p. 14 (1995).
Rotermund et al., "Application of periodically poled stoichiometric LiTaO$_3$ for efficient optical parametric chirped pulse amplification at 1 kHz", *Optics Express Opt. Soc.* America USA, vol. 12, No. 26, XP-002394708 (2004).
International Search Report and Written Opinion of the International Searching Authority, or the Declaration, for PCT/US2006/014109, mailed Sep. 13, 2006.
Baumgartner et al., "Optical Parametric Amplification", *IEEE J. Quantum Electronics*, QE15(6):432-444 (1979).
Collier et al., "Evaluation of an Ultrabroadband High-Gain Amplification Technique for Chirped Pulse Amplification Facilities", *Applied Optics*, 38(35):7486-7493 (1999).

(Continued)

*Primary Examiner*—Sung Pak
*Assistant Examiner*—Daniel Petkovsek
(74) *Attorney, Agent, or Firm*—Modern Times Legal; Robert J. Sayre

(57) ABSTRACT

A simple and low-cost apparatus amplifies short optical pulses (e.g., in the femtosecond domain) to high pulse energies using energy stored in an enhancement cavity. The enhancement cavity is first filled with pump light from a pump laser; and a signal laser then directs a signal pulse into the cavity, where the signal pulse and pump laser both pass through a non-linear medium for parametric amplification of the signal pulse, wherein energy from the aggregated pump light is transferred to the signal pulse, which then exits the enhancement cavity.

24 Claims, 4 Drawing Sheets

OTHER PUBLICATIONS

Couillaud et al., "High Power CW Sum-Frequency Generation Near 243 nm Using Two Intersecting Enhancement Cavities", *Optics Commun.*, 50(2):127-129 (1984).

Dubietis et al., "Powerful Femtosecond Pulse Generation by Chirped and Streched Pulse Parametric Amplification in BBO Crystal", *Optics Commun.*, 88(4,5,6):437-440 (1992).

Ilday et al., "Practical All-Fiber Source of High-Power, 120-FS Pulses at 1 μm", *Optics Lett.*, 28(15):1362-1364 (2003).

Ilday et al., "Generation of 50-fs, 5-nJ Pulses at 1.03 μm from a Wave-Breaking-Free Fiber Laser", *Optics Lett.*, 28(15):1365-1367 (2003).

Ilday et al., "Cavity-Enhanced Optical Parametric Chirped-Pulse Amplification", *Optics Lett.*, 31(5):637-639 (2006).

Jones et al., "Femtosecond Pulse Amplification by Coherent Addition in a Passive Optical Cavity", *Optics Lett.*, 27(20):1848-1850 (2002).

Jovanovic et al., "Optical Parametric Chirped-Pulse Amplifier as an Alternative to Ti:Sapphire Regenerative Amplifiers", *Applied Optics*, 41(15):2923-2929 (2002).

Nickel et al., "Fiber Based High Repetition Rate, High Energy Laser Source Applying Chirped Pulse Amplification", *Optics Commun.*, 190:309-315 (2001).

Potma et al., "Picosecond-Pulse Amplification with an External Passive Optical Cavity", *Optics Lett.*, 28(19):1835-1837 (2003).

Vidne et al., "Pulse Picking by Phase-Coherent Additive Pulse Generation in an External Cavity", *Optics Lett.*, 28(23):2396-2398 (2003).

\* cited by examiner

CAVITY-ENHANCED OPTICAL PARAMETRIC AMPLIFICATION

RELATED APPLICATION

This application claims the benefit of U.S. Provisional Application No. 60/670,441, filed on Apr. 12, 2005, the entire teachings of which are incorporated herein by reference.

GOVERNMENT SUPPORT

This invention was made with government support under Contract No. AFOSR-FA9550-04-1-0011 awarded by the Air Force Office of Scientific Research. The government has certain rights in the invention.

BACKGROUND

Amplification by coherent addition of a pulse train using an enhancement cavity has been proposed theoretically. See B. Couillland, et al., "High Power CW Sum-Frequency Generation Near 243 nm Using Two Intersecting Enhancement Cavities," Opt. Commun. 50, 127-129 (1984); see also R. J. Jones, et al., "Femtosecond Pulse Amplification by Coherent Addition in a Passive Optical Cavity," Opt. Lett. 27, 1848-1850 (2002); both of these publications are incorporated herein by reference in their entirety.

More recently, addition of a relatively small number of picosecond pulses (approximately 100 pulses) has been demonstrated independently by two research groups. E. O. Potma, et al., "Picosecond-Pulse Amplification with an External Passive Optical Cavity," Opt. Lett. 28, 1835-1837 (2003); Y. Vidne, et al., "Pulse picking by phase-coherent additive pulse generation in an external cavity," Opt. Lett. 28, 2396-2398 (2003); both of these publications are incorporated herein by reference in their entirety.

In this approach, the pulses are extracted from the cavity by the use of an active switching device (i.e., an acousto-optic modulator, AOM). Therefore, the duration and central wavelength of the amplified pulse is not altered in this process. A major shortcoming of this approach as applied to short pulses is the difficulty of constructing an enhancement cavity with sufficiently small dispersion for sub-picosecond pulses. Furthermore, the amplification factor is limited by the finesse of the cavity.

Optical parametric amplification is another well-established amplification technique suitable for a range of wavelengths. See R. A. Baumgartner, et al., "Optical Parametric Amplification," IEEE J. Quantum Electron QE-15, 432-444 (1979), which is incorporated by reference herein in its entirety. Application of the well-known chirped-pulse-amplification technique to parametric amplification was developed in the early 1990's. See A. Dubietis, et al., "Powerful Femtosecond Pulse Generation by Chirped and Stretched Pulse Parametric Amplification in BBO Crystal," Opt. Commun. 88, 433-440 (1992), which is incorporated by reference herein in its entirety.

This so-called parametric chirped-pulse amplification (P-CPA) has received attention recently. See. J. Collier, et al., "Evaluation of an Ultrabroadband High-Gain Amplification Technique for Chirped Pulse Amplification Facilities," Appl. Opt. 38, 7486-7493 (1999); see also I. Jovanovic, et al., "Optical Parametric Chirped-Pulse Amplifier as an Alternative to Ti:Sapphire Regenerative Amplifiers," Appl. Opt. 41, 2923-2929 (2002); both of these publications are incorporated herein by reference in their entirety. A major advantage of parametric chirped-pulse amplification is that single-pass gains on the order of $10^7$ can be obtained.

SUMMARY

Described herein are apparatus and methods for high-gain, chirped-pulse amplification of short optical "signal" pulses using "pump" light from a laser loaded into an enhancement cavity. The pump light can be in the form of a train of pulses, a Q-switched pulse or even continuous-wave (cw) laser emission. The enhancement cavity, which is defined by one or more optical elements, is low-loss and high-finesse for the pump wavelength, transparent for the signal wavelength and resonant with the pump wavelength (also matching the repetition rate, in the case of a pulsed pump source). The cavity also contains a nonlinear medium (e.g., a quadratic non-linear crystal) for optical parametric amplification.

Pump light from the "pump" laser is fed into the enhancement cavity where it is added to a circulating, aggregated pump light in the cavity. The signal pulse, which has a central wavelength longer than that of the pump light, is stretched to match the duration of the aggregated pump light in the enhancement cavity if the pump light is in the form of pulses from a mode-locked laser; or, if the pump light is in the form of a continuous wave or Q-switched pulses, the signal pulse is stretched to match the length of the cavity (i.e., the distance of a full circuit traversed by the pump light as it traverses the path among the mirrors). Generation of the signal pulse is synchronized with the pump light to target maximal spatial-temporal overlap of the signal pulse and the pump light within the quadratic medium for efficient parametric amplification, thereby transferring a large portion of the pump energy to the signal pulse.

In contrast with existing approaches concerning amplification of short pulses by parametric chirped-pulse amplification, the present methods introduce the important concept of pump light storage in an enhancement cavity. Accordingly, an important advantage of amplification by coherent addition is incorporated into parametric amplification. In contrast with existing disclosures of coherent pulse addition using an enhancement cavity, a completely new switching mechanism is introduced, wherein the parametric amplification functions as a nonlinear, all-optical switch.

Specific embodiments include mJ-level, femtosecond lasers operating at high repetition rates (10 kHz or higher) as well as J-to-kJ-level, femtosecond lasers operating at low repetition rates (10 Hz-to-1 Hz, or lower) and with greater freedom in the choice of the central wavelength. Such lasers can be compact, largely integrated, and inexpensive in comparison to alternative sources.

The amplified pulses can then be utilized in numerous contexts, such as in the production of hard x-rays (e.g., by shooting the amplified pulses into a noble gas), in spectroscopy, and in laser radar.

This combined use of coherent addition and parametric amplification offers numerous advantages over coherent addition, alone, as discussed below.

A first important advantage is that when amplifying very short pulses, via methods disclosed herein, only the signal pulses, which pass through the cavity only once, are spectrally broadband and fully phase coherent, while the pump light, which repeatedly circulates in the cavity, can undergo limited phase distortions. Especially, dispersive effects due to multiple reflections on the cavity mirrors are of greatly reduced importance for the typically picosecond-or nanosecond-long pump pulses. In contrast, researchers using existing coherent addition techniques to directly amplify femtosecond pulses by coherent addition are severely limited by the dispersion in the coherent cavity.

A second advantage is that the approach of this disclosure need not be limited by a switching mechanism that introduces loss and thereby limits the ultimate factor of amplification. The net amplification factor for the signal pulses is limited only by the parametric process (since, in principle, the ratio of the signal-pulse energy to the pump-light energy can be arranged to be any number. The parametric process has been demonstrated to produce amplification as high as 80 dB.

In previous enhancement-cavity approaches, the switching element sets a minimum cavity dimension due to the finite switching speed (i.e., the cavity had to be long enough that the switching process was completed before the pulse completes a full loop around the cavity). A third advantage provided by the methods of this disclosure is that the switching process can be instantaneous. Hence, the size as well as the repetition rate that can be reached is limited only by the practical size restrictions of constructing such a cavity with an imbedded crystal. In particular embodiments, the cavity can consist solely of a non-linear crystal with appropriate coatings on each side (serving as mirrors).

In previous cavity approaches, the central wavelength remained unaltered, restricting operation to wavelengths at which powerful femtosecond pulses were available. A fourth advantage provided by the methods of this disclosure is that the signal pulse can be at any wavelength as long as the conditions for parametric amplification are met. Since short pulses of small energy content have been demonstrated at virtually any optical wavelength, the approach of this disclosure can be utilized to produce powerful short pulses over the vast range of wavelengths where parametric amplification can be realized.

A fifth advantage is that, in the methods of this disclosure, useful idler light can be generated along with the amplification of the signal light. The idler wavelength will be typically, but not necessarily, longer, which by itself may be highly desirable for certain applications. The main characteristics of the idler light, such as its energy and duration, will be similar to the signal light.

Furthermore, this combined use of coherent addition and parametric amplification also offers advantages over parametric amplification, alone. Currently, parametric amplification is typically limited in the achievable energy and peak power from a given pump laser, which is limited due to nonlinear effects arising in the source. Via the methods described herein, the energy/power of the pump light can be increased by the enhancement factor of the cavity. This increase is very significant for pushing the boundaries for ultra-high-energy/power amplification, opening the door to energy and average power scales previously unreachable.

Also, the coherent addition of pulses in an enhancement cavity may otherwise be limited due to cavity detuning, which can build up during loading because of nonlinear effects in the crystal that facilitate the parametric amplification. A similar effect is observed in cavity-dumped systems using an acousto-optic modulator in the cavity [see "Nonlinear Dynamics Inside Femtosecond Enhancement Cavities," by K.D. Moll, R. Jason Jones, and Jun Ye, OPTICS EXPRESS, Vol. 13 1672-78 (2005), which is herein incorporated by reference in its entirety]. To avoid such limitations to coherent pulse addition, the methods of this disclosure can include an additional nonlinear process that compensates for the undesired effects in the parametric amplifier medium. In other implementations, the parametric amplifier medium can be engineered to compensate or can have a separate section that compensates for such effects. For example, a periodically poled lithium-niobate crystal can have one section that is patterned for optimum parametric amplification and an additional section that only generates a negative intensity-dependent refractive index compensating for the positive intensity-dependent refractive index from the first section by the use of cascaded quadratic nonlinearities [for a review, see "Applications of Cascaded Quadratic Nonlinearities to Femtosecond Pulse Generation," by F. Wise, L. Qian, X. Liu, J. Nonlin. Opt. Phys. Mat. 11, 317-338 (2002), which is herein incorporated by reference in its entirety]. In other implementations, the combined action of linear and nonlinear effects may be employed to avoid cavity-resonance shifts during the loading process.

Finally, previous procedures and apparatus, described in the Background section, above, can be utilized and combined in the procedures and apparatus described below.

BRIEF DESCRIPTION OF THE DRAWINGS

In the accompanying drawings, described below, like reference characters refer to the same or similar parts throughout the different views. The drawings are not necessarily to scale, emphasis instead being placed upon illustrating particular principles of the methods and apparatus characterized in the Detailed Description.

DETAILED DESCRIPTION

Figure 1:
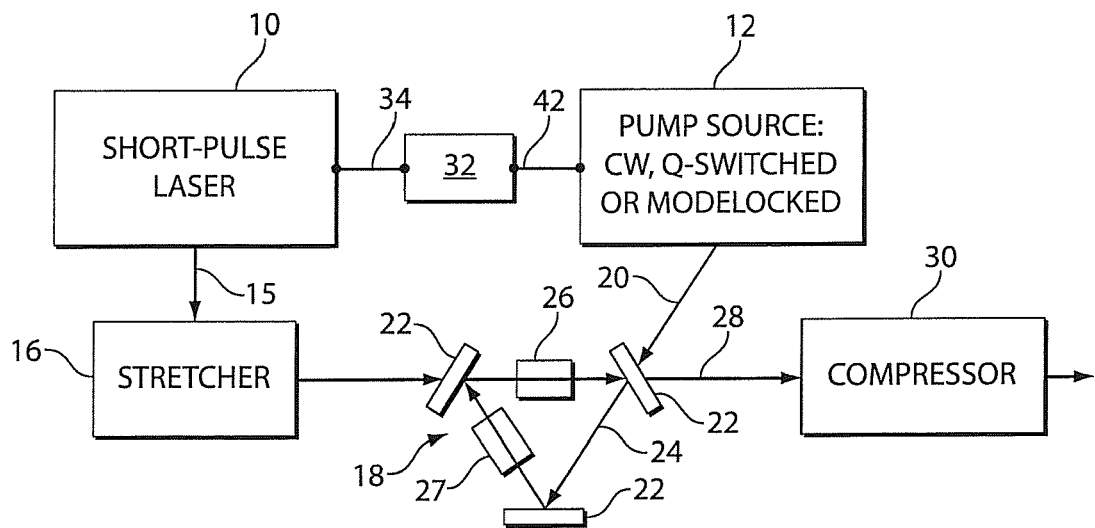
FIG. 1 is a schematic illustration of an optical-signal amplification apparatus including a pump laser, a pulsed laser to be amplified, an enhancement cavity with a nonlinear crystal imbedded for parametric amplification, and optional stretcher and compressor stages.

Summarized, below, are the building blocks of apparatus and methods for high-gain, chirped-pulse amplification of short optical pulses.

First, a high-finesse enhancement cavity defined by a one or more optical elements (e.g., a plurality of mirrors or a single optical element in which the light can circulate) is utilized to store pump light. The pump light can be in the form of a train of pulses, a single pulse from a Q-switched laser, or continuous-wave laser light.

Second, a quadratic nonlinear medium is embedded in the enhancement cavity and properly phase-matched for parametric amplification of the signal pulse by the pump light.

Third, a mechanism is provided to ensure timely arrival of the signal pulse at the end of one loading period and to ensure maximal temporal overlap of the signal pulse and the pump light. The loading period for the pump light into the enhancement cavity approximately matches the time needed for the enhancement cavity to reach maximal energy content.

Here, the enhancement cavity has a function analogous to the temporary storage of energy in an amplification medium based on stimulated emission by population inversion. Continuing this analogy, parametric conversion assumes the role of stimulated emission for transferring the stored energy to the pulse that is being amplified. Accordingly, the apparatus and procedures herein described upgrade parametric amplification by incorporating storage of pump light. This incorporation is accomplished with negligible impact on the existing advantages of parametric amplification, which include engineerable gain parameters, wide gain bandwidth, and extremely high single-pass gain.

These apparatus and methods are suitable for numerous applications, particularly in the amplification of femtosecond pulses to mJ and higher pulse energies. An important feature is the flexibility with regards to the choice of the pump light. The pump can range from continuous-wave light to femtosecond pulses, provided the conditions for parametric amplification (i.e., the pump photon frequency equals the sum of the signal and idler photon frequencies, and phase-matching is ensured) are met. A simplified schematic illustration of the apparatus is provided in FIG. 1, wherein a pump laser 12 generates pump light 20, which is aggregated in the enhancement cavity 18; meanwhile, a signal laser 10 generates a signal pulse 15, which is directed into the enhancement cavity 18 for parametric amplification.

The pump laser 12 and signal laser 10 are electronically coupled to an electronic synchronization controller 32 via cables 34 and 42. The synchronization controller 32 may include a processor, electronic output ports and computer-readable memory storing software code for generating and transmitting trigger signals to the pump laser 12 and to the signal laser 10 to synchronize their operation. The synchronization controller 32 sends a respective electronic trigger signal to the pump laser 12 to generate a series of pump pulse streams 20 separated by an integral multiple of the period of the pump pulses in the cavity 18 so that the pump pulses will interfere constructively to form an increasing aggregate pump pulse 24 in the cavity 18. Additionally, the synchronization controller 32 sends a trigger signal to the signal laser 10 to generate a signal pulse 15 at a time such that the signal pulse 15 will pass through the nonlinear medium 26 at the same time as the aggregated pump pulse 24.

The nonlinear medium 26 for parametric amplification can be, for example, any of the following: magnesium-oxide-doped periodically poled lithium niobate (MgO:PPLN), periodically poled potassium titanyl phosphate (PPKTP), periodically poled potassium titanyl arsenate (PPKTA), β-barium borate (BBO), $AgGaS_2$, $AgGaSe_2$, or GaSe. A second nonlinear medium 27 is also included in the cavity in the path of the pump pulse 24 for nonlinearity management. The nonlinear medium 27 for nonlinearity management can be formed of, for example, MgO:PPLN, PPKTP, PPKTA, BBO, ZnO, ZnSe, or highly nonlinear glass. The poling period for poled nonlinear media will be chosen as a function of whether it is to be used for the parametric amplification or for the nonlinearity management.

We consider, below, the use of three different pump lasers 12, a continuous-wave laser, a Q-switched laser, and a mode-locked laser.

In a first embodiment, illustrated in FIG. 1, a continuous-wave laser is used as the pump laser 12, which feeds pump light 20 into an enhancement cavity 18. For higher-energy pulse generation, the enhancement cavity 18 is contained in a sealed structure to which a vacuum pump is attached to maintain a vacuum across the optical pathways. The enhancement cavity 18 includes an optical pathway defined by mirrors 22 and has a high quality factor, Q; a high finesse, F; and a roundtrip time (i.e., traversing a full loop across the optical pathway defined by the mirrors 22) of $T_R$. Aggregated continuous-wave laser light 24 fills the cavity 18 to near maximum capacity after a loading time of $T_{load}$, which approximately equals $T_R \cdot F$. Signal pulses 15 with duration close to $T_R$ and a repetition rate close to $1/(T_R \cdot F)$ from a signal laser 10 can be amplified efficiently in the enhancement cavity 18.

This procedure can be particularly advantageous for amplification at wavelengths at which conventional amplification techniques are difficult to realize. In general, the signal pulses 15 are much shorter than $T_R$ and are stretched to pulse durations approximately equal to $T_R$. For instance, consider an apparatus including (a) a continuous-wave pump source 12 having an average power of 100 W, (b) an enhancement cavity 18 having a $T_R$ of 100 ps and an F of 1000, and (c) a 10 MHz-repetition-rate signal source 10 of 10 fs pulses that are stretched to 100 ps. Such an apparatus can amplify the chirped 10-fs signal pulses 15 to several microjoules.

In a second embodiment, a Q-switched laser is used as the pump laser 12. The Q-switched pulses 20 have a duration approximately equal to $T_R \cdot F$. For instance, where $T_R$=100 ps and F=1000, a Q-switched source 12 providing 10-mJ, 100-ns pump pulses 20 can be utilized to amplify chirped signal pulses 15 to several-mJ pulse energy.

In a third embodiment, a mode-locked laser is used as the pump laser 12. The repetition rate of the pump laser 12 matches $1/T_R$. The signal pulses 15 are stretched to match the duration of the aggregated pump light 24 in the enhancement cavity 18, where typical pulse widths range from 10 ps to 1.0 ns.

Highly reflecting, low-loss mirrors 22 (available, e.g., from Newport Corporation of Irvine, Calif., USA, or, as formed via ion beam sputtering from Advanced Thin Films of Longmont, Colo., USA) can be used to define the enhancement cavity 18 as a closed optical path in which the aggregated laser-generated photons 24 are circulated. Three mirrors 22 are illustrated, though more or fewer can be used. The mirrors 22 are chosen so as to be highly reflective for a narrowband of wavelength corresponding to the aggregated pump light 24 and yet to be substantially transparent at the wavelength band of the signal pulse 15. Consequently, the aggregated pump light 24 will be contained within the cavity 18 via reflection at the mirrors 22, while the signal pulse 15 can pass through the mirrors 22 with minimal interference. Accordingly, when energy is transferred from the aggregated pump light 24 to the signal pulse 15 in the nonlinear medium 26, a gate is effectively opened whereby the energy can leave the cavity via the amplified signal pulse 28, akin to optical switching.

Using modem mirror technology, which includes very-low-loss mirrors, up to 10,000 optical pulses can be added if a very-high-quality cavity is used. Very-low-loss mirrors are described, e.g., in G. Rempe et al., "Measurement of Ultralow Losses in an Optical Interferometer," 17 Optics Letters 5, pp. 363-365 (2002), which is incorporated by reference herein in its entirety.

Accumulation of so many optical pulses in the enhancement cavity 18 is possible because of advances in frequency metrology, which enable a cavity to be locked very precisely to the comb of a mode-locked laser that signals the pump source 12 that generates the pulse stream for the cavity loading. See, e.g., V. Yanovsky, et al., "Frequency Doubling of 100-fs Pulses with 50% Efficiency by Use of a Resonant Enhancement Cavity," 19 Optics Letters 23, pp. 1952-1954 (1994), and R. Jones, et al., "Femtosecond Pulse Amplification by Coherent Addition in a Passive Optical Cavity," 27

Optics Letters 20, pp. 1848-1850 (2002); these two articles are incorporated herein by reference in their entireties.

An advantage of using a very-high-finesse enhancement cavity lies in the fact that one can load the cavity 18 with a constant optical-pulse stream 20 from, e.g., an amplified mode-locked laser at regular repetition rates. When fiber lasers are used as the pump source 12, the photon stream 20 can be stretched and compressed in a stretcher 16 and compressor 30, each of which can be in the form of, e.g., a grating, a pair of prisms, or Gires-Tournois interferometers (GTI); however, there the stretching and compression can be done in a robust way (i.e., also in special fiber).

Additional discussion of coherent addition of optical pulse trains using an enhancement cavity is provided in U.S. Pat. No. 6,038,055, the teachings of which are incorporated herein by reference in their entirety.

For very-high-Q enhancement cavities, dispersion compensation may be employed to avoid broadening of the aggregated pump light 24 in the enhancement cavity 18 due to the dispersive effects of the nonlinear crystal 26. For example, chirped mirrors or Gires-Tournois etalons can be employed in the cavity 18, wherein light at different wavelengths will penetrate different distances into the mirrors 22, thereby accumulating chirp that can be made to cancel the dispersion of the nonlinear crystal 26.

Figure 2:
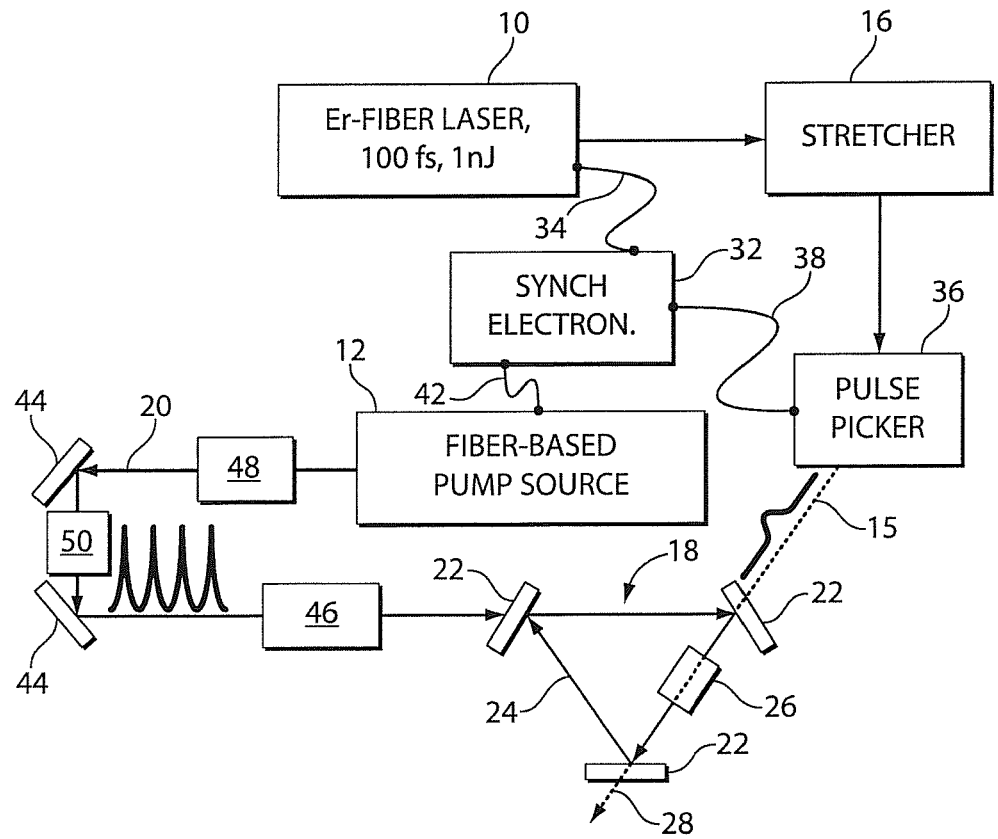
FIG. 2 is a schematic illustration of the addition of multiple pump pulses in an enhancement cavity and energy extraction out of the cavity through the parametric amplification process.

Another embodiment is illustrated in FIG. 2. This implementation can scale up the maximum pulse energy available from fiber-based sources by one to two orders of magnitude.

As shown in FIG. 2, multiple pump pulses 20 (e.g., 10 to 1,000 or even up to 10,000) from the pump source 12 are added in the enhancement cavity 18. The energy of the aggregated pulse 24 then is extracted from the cavity 18 via the parametric amplification process. Packets of pump pulses 20 are produced by an Yb-fiber laser 12; the pulses 20 have a duration of about 100 fs, and the pulse-to-pulse separation is about 20 ns. These pulses 20 are directed toward the cavity 18 by mirrors 44 and stretched in the stretcher 48 to about 1 ns and amplified in the fiber amplifier 50 from, e.g., 10 nJ to, e.g., 1 mJ. The maximum energy of the pulses 20 may be limited by nonlinearity. For further discussion regarding use of the Yb-fiber laser, see F. O. Ilday, et al., "Generation of 5-nJ, 50-fs Pulses at 1.03 μm from a Wave-Breaking-Free Fiber Laser," 28, 1365-1367 (2003) and F. O. Ilday, et al., "Practical All-Fiber Source of High-Power, 120-fs Pulses at 1 μm," Opt. Lett. 28, 1362-1364 (2003); both of these publications are incorporated herein by reference in their entirety. Optionally, the pump-pulse packets 20 can be passed through a frequency-doubling crystal 46, which can be lithium triborate ("LBO") or β-barium borate ("BBO"), before entering the enhancement cavity 18.

Since high average powers (e.g., 10-100 W) can be obtained from fiber amplifiers, the pump pulse packet 20 can contain much more energy than the individual pulses that together make up the packet 20. For an initial demonstration, consider a 100-pulse packet with up to 10 μJ per pulse (a modest target) and hence total pulse energy of 1 mJ. At an overall repetition rate of 10 kHz, this corresponds to 10 W of average power.

When the enhancement cavity 18 is fully loaded with the aggregated pump light 24, a second laser 10 produces sub-100-fs signal pulses 15, and those pulses 15 are stretched in the stretcher 16 to match the duration of the aggregated pump light 24, passed through pulse picker 36, which lets pass, e.g., every $100^{th}$ pulse to reduce the repetition rate. In another embodiment, the signal light and the seed for the amplifier generating the pump light may come from a single wideband laser source. The pulses are then directed into the enhancement cavity 18 to undergo parametric interaction with the aggregated pump light 24, where the energy of the signal pulse 15 can be amplified by a factor, e.g., of $10^2$ to $10^8$. The two lasers 10, 12 are synchronized by the electronic synchronization module 32 to ensure matched timing of the signal pulse 15 and the aggregated pump light 24. The electronic synchronization module 32 includes electronic circuitry and an optical modulator for gating the signal laser 10 to generate the signal pulse 15 after the pump laser 12 has filled the enhancement cavity with pump light 24 at a specified energy level. In this embodiment, the synchronization module 32 electronically communicates with and controls the signal laser 10, the pump laser 12, and the pulse picker 26 to synchronize the timing of the signal and pump pulses via respective electrical cables 34, 38 and 42.

In one embodiment, where the pump laser 12 is a Yb-fiber laser, the signal laser 10 for producing the signal pulse 15 is an Er-fiber laser. In another embodiment, where the pump laser 12 is a Yb-fiber laser or a Yb-bulk laser, and where a frequency-doubling crystal is placed in the path from the output of the pump laser 12, the signal laser 10 is a Ti:sapphire laser.

In one example, an ytterbium-laser is used to generate a pump pulse 20 having a wavelength of 1030 nm, and the pump pulse 20 is then passed through a frequency-doubling crystal 46, which reduces the wavelength of the pulse 20 to 515 nm. A signal pulse 15 at 800 nm is then passed through the cavity 18 and through the nonlinear medium 26 with the aggregated pump light 24. The aggregated pump light 24 is effectively split into (a) a pulse having a wavelength, $\lambda_s$, matching that of the signal pulse 15 and being combined with the signal pulse 15 to produce an amplified signal pulse 28 and (b) an idler pulse having a wavelength, $\lambda_i$. The wavelength of the idler, $\lambda_i$, and the wavelength of the signal, $\lambda_s$, are related to the wavelength of the pump light, $\lambda_p$, as follows: $1/\lambda_i + 1/\lambda_s = 1/\lambda_p$. This condition corresponds to energy conservation at the individual photon level. Accordingly, an idler wavelength of about 1446 nm is produced with the aggregated pump light 24 at 515 nm and with a signal pulse 15 at 800 nm. In other words, for each new signal photon to be created by the parametric amplification process, a corresponding idler photon will also be created.

The process can generate 0.1-0.5-mJ, sub-100-fs amplified signal pulses 28 at a 10-kHz repetition rate using existing components. Provided with improved fiber-amplifier performance and with the addition of a larger number of pump pulses 20 in the enhancement cavity 18 (as a consequence of higher cavity finesse), such a fiber-based signal laser 10 is scalable to produce higher energies and average powers in the amplified pulses 28, e.g., 10-50-mJ, sub-100-fs pulses at 10 kHz. Such a system would be unparalleled in its performance. With the use of much-shorter signal pulses 15 (e.g., sub 10-fs pulses directly from a solid state laser or from a fiber laser and pulse compression), an apparatus producing 1 TW of peak power can be envisioned.

Figure 3:
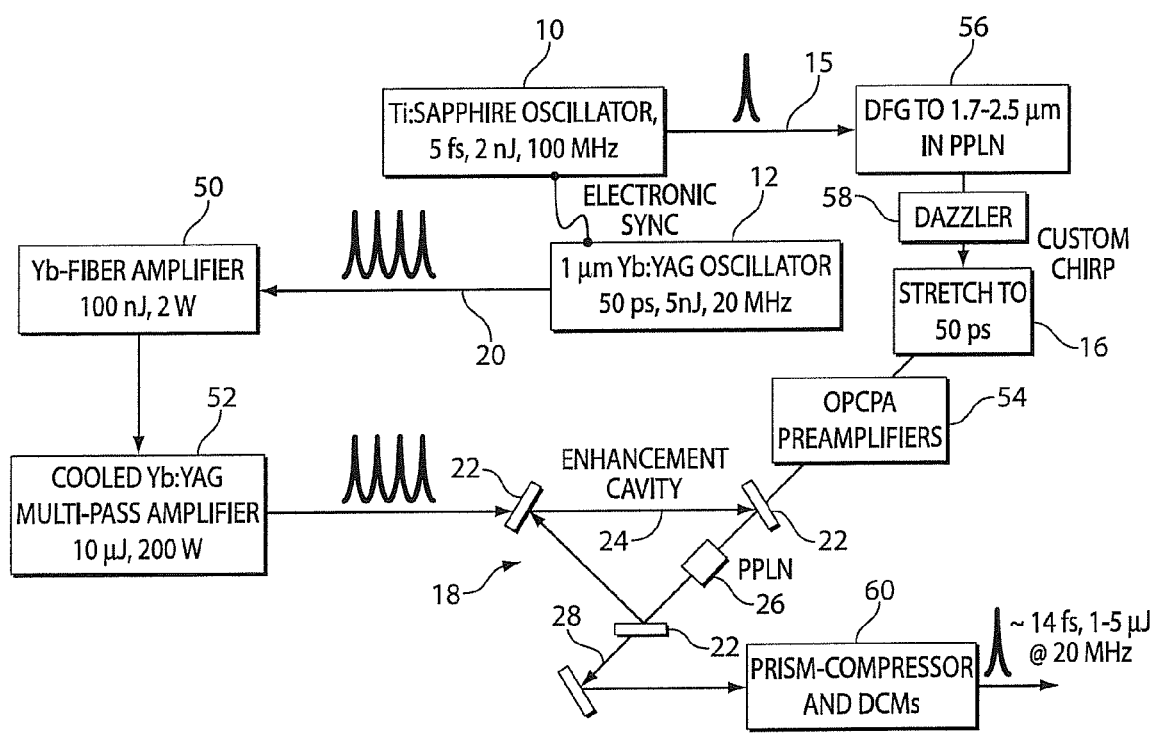
FIG. 3 is a schematic illustration of an embodiment of a cavity-enhanced optical parametric chirped-pulse amplifier for generating a high-repetition-rate stream of high-energy pulses at the full repetition rate of the laser.

A cavity-enhanced optical parametric chirped pulse amplifier for generating a high-repetition-rate stream of high energy pulses at the full repetition rate of the laser is illustrated in FIG. 3. In this case, the repetition rate is 20 MHz. The pump laser 12 includes 1-μm Yb:YAG oscillator producing 50 picosecond pulses at 5 nJ. The pump pulses 20 produced therefrom are passed through an Yb-fiber preamplifier to boost the pulse energy to 100 nJ (2 W) and then through a cooled Yb:YAG multi-pass amplifier to further boost the pulse energy to 10 μJ (200 W) before entering the enhancement cavity 18, wherein the nonlinear medium for parametric amplification is periodically poled lithium niobate.

The signal laser 10 includes a Ti:sapphire oscillator and produces 5 fs signal pulses at 2 nJ and 100 MHz. The signal pulses 15 pass through periodically poled lithium niobate for difference frequency generation 56 to increase the wavelength of the signal pulse 15 from a range of 650-1100 nm to a range of 1.7-2.5 µm. The signal pulses 15 then pass through an acousto-optic pulse shaper (such as the DAZZLER pulse shaper from Fastlite of Paris, France), which provides dispersion/phase compensation for higher order dispersive terms. The pulses 15 then pass through a stretcher 16 (e.g., a grating, a pair of prisms, or a GTI) in which the pulses 15 are stretched to 50 picoseconds and then a pre-amplifier 54 before entering the enhancement cavity 18, in which each signal pulse 15 passes through a non-linear medium in the form of periodically poled lithium niobate at the same time as the aggregated pump pulses to undergo parametric amplification. Upon leaving the enhancement cavity 18, the amplified signal pulse 28 is redirected by a mirror through a prism compressor and dispersion-compensating mirrors 60 and/or through other optical elements to obtain desired characteristics in the amplified pulse 28. In this case, the prism compressor and dispersion-compensating mirrors 60 produce approximately 14-femtosecond pulses at 1-5 µJ and 20 MHz.

Figure 4:
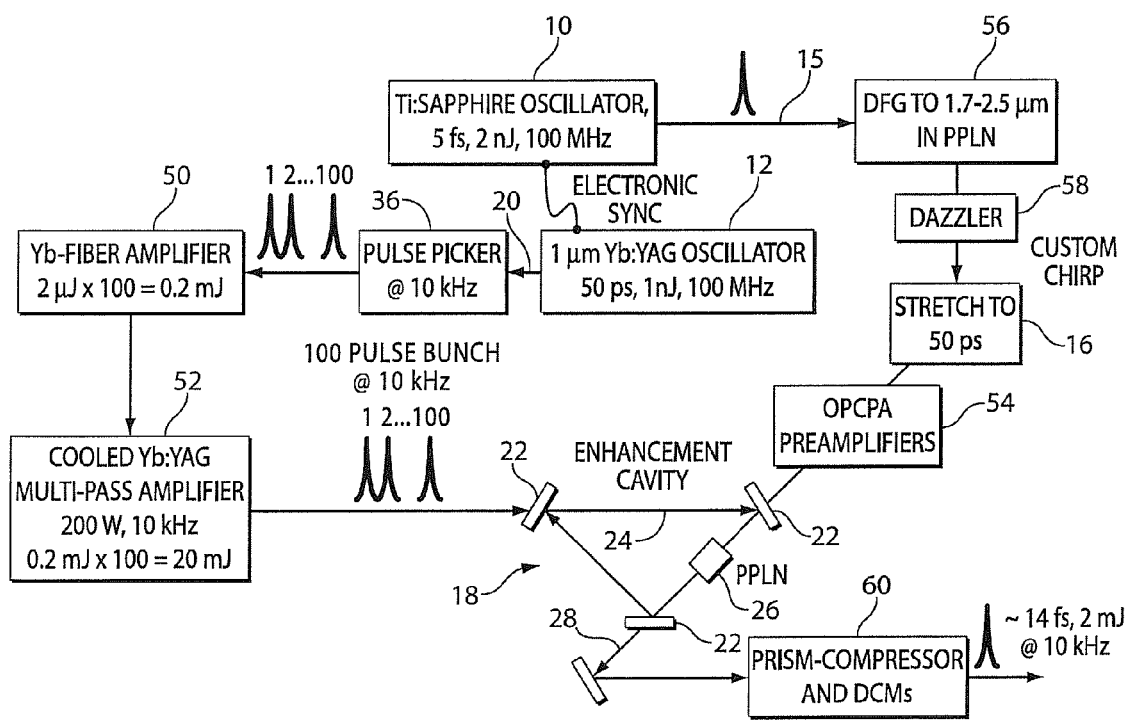
FIG. 4 is a schematic illustration of an embodiment of a cavity-enhanced optical parametric chirped-pulse amplifier for generating a low-repetition-rate stream of high-energy pulses.

A cavity-enhanced optical parametric chirped-pulse amplifier for generating a low-repetition-rate stream of high-energy pulses is illustrated in FIG. 4. In this embodiment, the signal laser 10 and the other components in the path of the signal pulse 15 leading to the enhancement cavity 18 are the same as in the embodiment of FIG. 3. In FIG. 4, the Yb:YAG oscillator is again 1 µm and produces 50-picosecond pump pulses 20, though, in this case, at 1 nJ and 100 MHz. A pulses picker 36 is provided in the path of the pump pulses 20 to serve as a gate, allowing periodic bursts of pulses to pass through, in this case, producing repetitions of 100-pulse bursts at a repetition frequency of 10 kHz. The bunched pump pulses 20 are then amplified in an Yb-fiber amplifer 50 to 2 µJ per pulse (for a total of 0.2 mJ for the 100 pulse bunch). In the next stage, a cooled Yb:YAG multi-pass amplifier increases the power to 200W and 0.2 mJ per pulse (20 mJ total), with the bunch repetition frequency still at 10 kHz. About half of the pump pulse energy is loaded into the cavity. The amplified signal pulses 28 exiting the cavity 18 and after passing through the prism compressor and dispersion-compensating mirrors 60 are approximately 14-femtosecond pulses at 2 mJ and 10 kHz.

Figure 5:
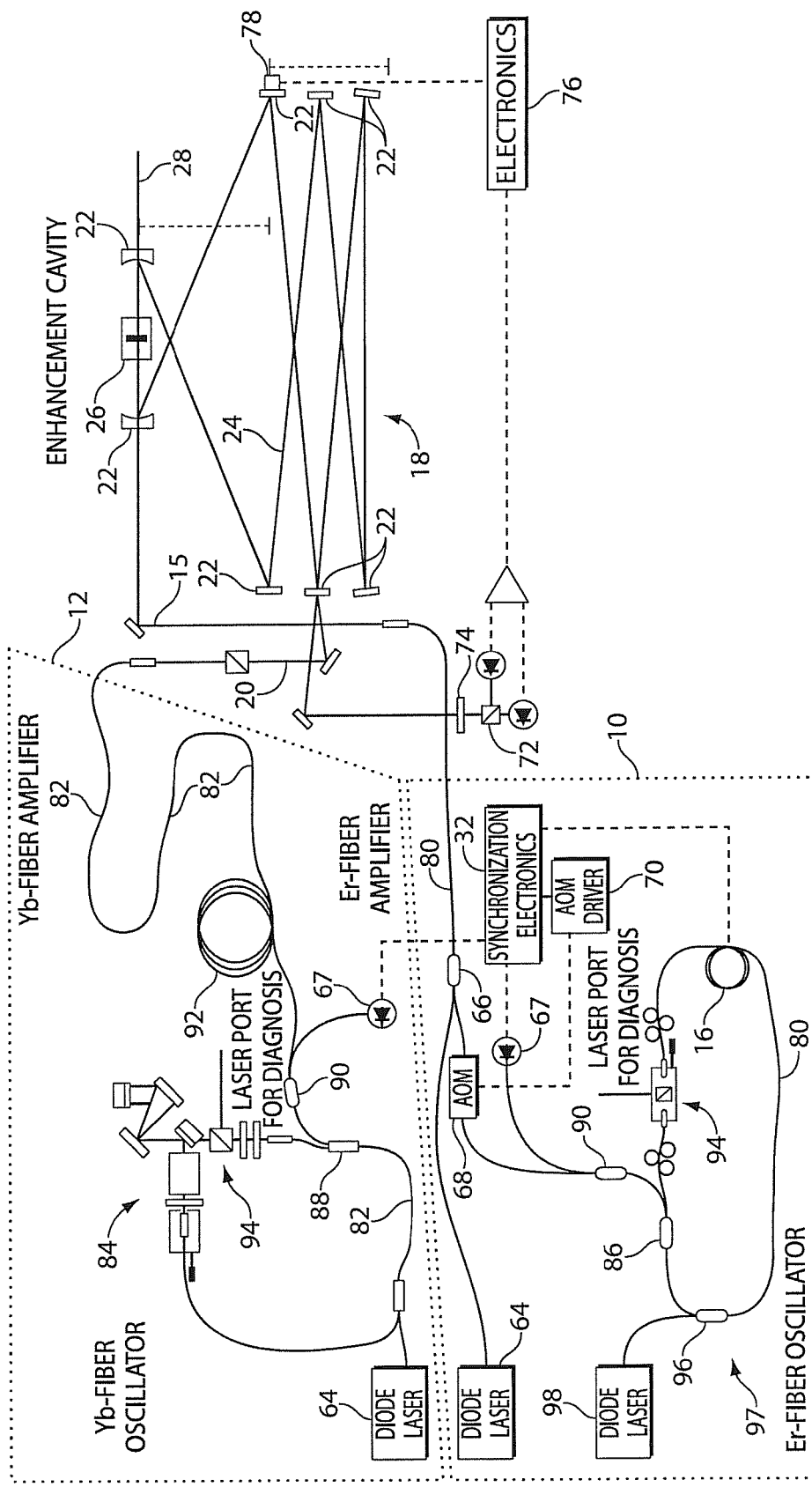
FIG. 5 is an illustration of a fiber laser apparatus for the cavity-enhanced optical parametric chirped-pulse amplification.

An embodiment of a cavity-enhanced optical parametric chirped-pulse amplification apparatus at 1.55 µm using an amplified 1.06-µm fiber laser as a pump laser 12 and a 1.55-µm fiber laser as a signal laser 10 is illustrated in FIG. 5. The pump pulses 20 are coherently added in a cavity 18 locked onto the incoming pump pulse stream from the pump laser 12 using the Hänsch-Couillaud locking technique. The components of the signal laser 10 and those of the pump laser 12 are circumscribed within respective dotted boxes.

The signal laser 10 includes a diode laser 98 that generates a pump laser light that propagates counter-clockwise in the optical-fiber loop 97. The optical-fiber loop 97 includes an erbium-doped fiber segment 80 that generates a clockwise-propagating laser pulse when stimulated by the pump laser light from the diode laser 98. The optical fiber loop 97 also includes a stretcher 16 and a laser port 94 for analyzing the properties of the pulse.

An isolator and 5% coupler 86 allows passage of only optical pulses propagating clockwise and channels 5% of the incoming pulse 20 to another optical fiber to a 30% coupler 90 that channels 30% of the incoming pulse to a photo diode 67 coupled with the synchronization electronics 32; the photo diode 67 detects the arriving pulse and signals this to the synchronization control electronics 32. The remaining 70% of the incoming pulse is directed to an acousto-optic modulator (AOM) 68, which together with the AOM driver 70 functions as a pulse picker (36 in FIGS. 2 and 4), allowing, e.g., every one hundredth pulse to pass through. An additional diode laser 64 pumps an erbium-doped fiber segment 80 via a wavelength combiner 66 to amplify the signal pulses from the AOM 68.

The pump laser 12 includes an ytterbium-fiber oscillator 84 that generates a pump pulse, which is preamplified and passed through an ytterbium-doped fiber segment 82 for amplification; and then a 9% coupler directs 91% of the pulse through a laser port 94 for optional diagnosis and back to the oscillator 84. The other 9% of the pulse is directed to a 30% coupler 90 that directs 30% of the pulse to a photo diode 67, which signals the timing of the pump pulses to the electronic synchronization controller 32. The remaining 70% of the pump pulse passes through a single-mode fiber coil 92 for pre-chirping and then through a plurality of ytterbium fiber segments 82 for amplification. The pump pulse 20 is then directed through one of the mirrors 22 into the enhancement cavity 18.

This enhancement cavity 18 includes eight mirrors to accommodate a repetition rate of 80 MHz. The resonator length in the cavity 18 is locked to the repetition rate via a piezoelectric transducer 78 coupled with one of the mirrors 22. The piezoelectric transducer 78 can finely displace the mirror 22 to make subtle adjustments to the resonator length to accommodate, e.g., expansion or contraction of elements due to changes in temperature. 1% outward transmission of the aggregated pump pulse 24 is obtained at the mirror 22 through which the pulse is shown passing (all of the other mirrors 22 lack this 1% transmission and, instead, have very-high reflectivity). The escaped pulse is passed through a quarter wave plate 74 to rotate the polarization of the pulse, if desired, and through a polarizing beam splitter 72 and analyzed by the electronic controller 76 to accordingly command the piezoelectric transducer 78.

In describing embodiments of the invention, specific terminology is used for the sake of clarity. For purposes of description, each specific term is intended to at least include all technical and functional equivalents that operate in a similar manner to accomplish a similar purpose. Additionally, in some instances where a particular embodiment of the invention includes a plurality of system elements or method steps, those elements or steps may be replaced with a single element or step; likewise, a single element or step may be replaced with a plurality of elements or steps that serve the same purpose. Moreover, while this invention has been shown and described with references to particular embodiments thereof, those skilled in the art will understand that various other changes in form and details may be made therein without departing from the scope of the invention.

What is claimed is:

1. A method for amplifying an optical signal comprising:
   generating laser pump light;
   directing the pump light into an enhancement cavity within which the pump light is circulated and aggregated, wherein the pump light is in the form of pulses and wherein at least 10 pump-light pulses are added in the enhancement cavity, the enhancement cavity being defined as a closed light path for the pump light by one or more optical elements;
   generating a laser signal pulse;
   directing the laser signal pulse into the enhancement cavity, the signal pulse and the pump light both passing through a non-linear medium for parametric amplification in the enhancement cavity, energy from the pump light being transferred to the signal pulse in the non-linear medium, thereby amplifying the signal pulse; and
allowing the amplified signal pulse to exit the enhancement cavity.

2. The method of claim 1, wherein no more than 1,000 pump-light pulses are added in the enhancement cavity.

3. The method of claim 1, wherein no more than 10,000 pump-light pulses are added in the enhancement cavity.

4. A method for amplifying an optical signal comprising:
generating laser pump light;
directing the pump light into an enhancement cavity within which the pump light is circulated and aggregated, the enhancement cavity being defined as a closed light path for the pump light by one or more optical elements;
generating a laser signal pulse;
directing the laser signal pulse into the enhancement cavity, the signal pulse and the pump light both passing through a non-linear medium for parametric amplification in the enhancement cavity, energy from the pump light being transferred to the signal pulse in the non-linear medium, thereby amplifying the signal pulse, wherein the energy of the signal pulse is amplified by a factor of at least $10^3$ in the enhancement cavity; and
allowing the amplified signal pulse to exit the enhancement cavity.

5. An apparatus for amplifying an optical signal comprising:
a laser apparatus including a first laser for generating a pump light and a second laser for generating a signal pulse;
an enhancement cavity, wherein the laser apparatus is positioned and oriented to direct the pump light and signal pulse into the enhancement cavity, the enhancement cavity including:
one or more optical elements configured to define a closed light path for pump light directed into the cavity; and
a non-linear medium for parametric amplification in the enhancement cavity and positioned and oriented to receive both the pump light circulating through the closed light path and the signal pulse so as to be able to transfer energy from the pump light to the signal pulse; and
an electronic synchronization device coupled with both the first laser and the second laser and comprising electronic circuitry and an optical modulator for gating the second laser to generate the signal pulse after the first laser has filled the enhancement cavity with pump light at a specified energy level.

6. The apparatus of claim 5, wherein the first laser is selected from a continuous-wave laser, a Q-switched laser and a mode-locked laser.

7. The apparatus of claim 5, wherein the first laser is a Yb-bulk laser.

8. The apparatus of claim 7, wherein the second laser is an Er-fiber laser.

9. The apparatus of claim 8, wherein the first laser is selected from a Yb-fiber laser and a Yb-bulk laser, the apparatus farther comprising a frequency-doubling crystal in the light path of the first laser.

10. The apparatus of claim 9, wherein the second laser is a Ti:sapphire laser.

11. The apparatus of claim 5, further comprising an additional linear and/or nonlinear pulse-shaping mechanism to compensate for the detrimental effects of nonlinearities in the non-linear medium for parametric amplification that may limit the loading process of the cavity.

12. The apparatus of claim 11, wherein the pulse-shaping mechanism includes a second nonlinear medium that has an intensity-dependent refractive index compensating for the intensity-dependent refractive index of the non-linear medium for parametric amplification.

13. The apparatus of claim 5, wherein the non-linear medium is a medium with quadratic nonlinearity and has two or more sections, where at least one section is responsible for the parametric amplification process and at least one other section compensates for the undesired nonlinear effects occurring in the amplification sections.

14. A method for amplifying an optical signal comprising:
directing pump light into an enhancement cavity within which the pump light is circulated in a closed light path for the pump light, wherein the closed light path is defined by one or more optical elements that substantially reflect the pump light; then
continuing to direct additional pump light into the enhancement cavity, with the additional pump light timed to interfere constructively with the pump light that is already circulating in the enhancement cavity to increasingly amplify the energy of the circulating pump light; then, after the continued introduction of pump light has amplified the energy of the circulating pump light in the enhancement cavity to a specified level,
directing a signal pulse into the enhancement cavity, the signal pulse and the amplified pump light both passing through a non-linear medium for parametric amplification in the enhancement cavity, and synchronizing the entry of the signal pulse into the enhancement cavity so that the signal pulse and the amplified pump light pass through the non-linear medium at the same time to transfer energy from the amplified pump light to the signal pulse, thereby amplifying the signal pulse; and
allowing the amplified signal pulse to exit the enhancement cavity.

15. The method of claim 14, wherein the pump light and the signal pulse have different wavelengths, the optical element(s) including at least one mirror in the path of the signal pulse that substantially reflects pump light while being substantially transparent to the signal pulse and thereby allowing the amplified signal pulse to escape the enhancement cavity.

16. The method of claim 14, wherein the signal pulse is stretched before it enters the enhancement cavity.

17. The method of claim 16, wherein the signal pulse is compressed after it exits the enhancement cavity.

18. The method of claim 14, wherein the amplified signal pulse has an energy of at least 0.1 mJ.

19. The method of claim 18, wherein the amplified signal pulse is linearly compressible to no more than about 100 fs.

20. The method of claim 19, wherein amplified signal pulses are produced at a repetition rate of at least about 10 kHz.

21. The method of claim 20, wherein the amplified signal pulse has an energy of at least about 10 mJ.

22. The method of claim 14, wherein the pump light is in the form of pulses.

23. The method of claim 14, wherein the pump light is in the form of pulses and at least 10 pump-light pulses are added in the enhancement cavity.

24. The method of claim 23, wherein the energy of the signal pulse is amplified by a factor of at least $10^3$ in the enhancement cavity.

* * * * *